United States Patent Office 3,069,253
Patented Dec. 18, 1962

3,069,253
ALKENYL PYRIDINIUM QUATERNARY
COMPOUNDS AS DEFOLIANTS
Anthony A. Sousa, Raleigh, N.C., assignor to Union
Carbide Corporation, a corporation of New York
No Drawing. Filed Apr. 11, 1961, Ser. No. 102,129
15 Claims. (Cl. 71—2.5)

This invention relates to the defoliation of plants, employing alkenyl pyridinium quaternary compounds. More particularly, this invention relates to the use of these compounds as cotton defoliants.

In harvesting agricultural crops with mechanical equipment, the plant leaves often interfere with effective operation of the harvesting machine. In addition, the quality of the harvested product may be deleteriously affected by the presence of leaves. For example, in the case of cotton, the presence of leaves results in a discolored harvested crop. With the increase in mechanized harvesting of crops, it has become increasingly important to find efficient methods for defoliation.

Although a number of compounds have been found to exhibit defoliating activity, no completely satisfactory material had been found prior to the present invention. For example, some of the known defoliants are inflammable and, thus, are dangerous as potential fire hazards. Some are difficult to formulate, while others have disagreeable odors.

The compounds employed in this invention avoid the numerous disadvantages of the known materials. By employing these compounds in accordance with the present invention, rapid and effective defoliation is obtained. These compounds are not potential fire hazards and do not possess a disagreeable odor. In addition, aqueous formulations of these compounds are easily made and, furthermore, such aqueous formulations possess desirable surface active characteristics and, thus, avoid the necessity of employing surface active agents.

The present invention comprises defoliating plants by applying to them certain alkenyl pyridinium quaternary compounds. The alkenyl pyridinium quaternary compounds which may be employed can be represented by the general formula:

(1) 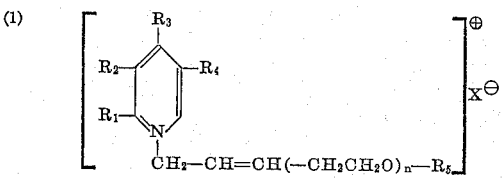

wherein $R_1$, $R_2$, $R_3$, and $R_4$ are selected from the group consisting of hydrogen and alkyl radicals having from one to eight carbon atoms, inclusive, preferably from one to four carbon atoms, inclusive; $n$ is an integer having a value from 0 to 1; when $n$ is 0, $R_5$ is a member selected from the group consisting of alkyl radicals, alkenyl radicals, alkyl-cycloalkyl radicals, alkyl-cycloalkenyl radicals, alkenyl-cycloalkyl radicals and alkenyl-cycloalkenyl radicals and contains from one to eighteen carbon atoms, inclusive, preferably from five to ten carbon atoms, inclusive, when $n$ is 1, $R_5$ is an alkyl radical having from one to ten carbon atoms, inclusive; and X is a halogen radical, such as chlorine or bromine, preferably a chlorine radical.

The compounds used in this invention comprise two groups. One group may be represented by the general formula:

(2) 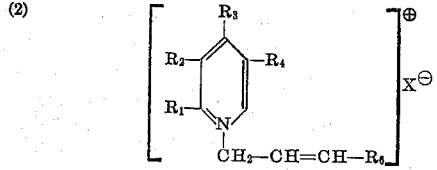

wherein $R_1$, $R_2$, $R_3$, $R_4$ and X are as defined above and $R_6$ is selected from the group consisting of alkyl radicals, alkenyl radicals, alkyl-cycloalkyl radicals, alkyl-cycloalkenyl radicals, alkenyl cycloalkyl radicals, and alkenyl cycloalkenyl radicals and contains from one to eighteen carbon atoms, inclusive, preferably from five to ten carbon atoms, inclusive.

Typical of the compounds of this group is 1-(5,5,7,7-tetramethyl-2-octenyl)-2-methyl-5-ethyl pyridinium chloride which has the structural formula:

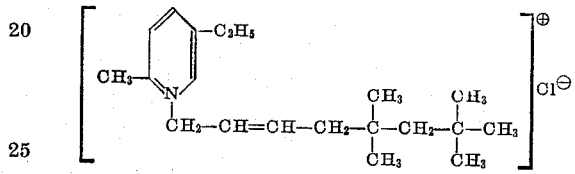

Also illustrative of the compounds in this group are:
1-(2-octenyl)-2-methyl pyridinium chloride,
1-(2-octenyl)-3-methyl pyridinium chloride,
1-(2-octenyl)-4-methyl pyridinium chloride,
1-(2-octenyl)-5-methyl pyridinium chloride,
1-(2-octenyl)-2-ethyl pyridinium chloride,
1-(2-octenyl)-3-ethyl pyridinium chloride,
1-(2-octenyl)-4-ethyl pyridinium chloride,
1-(2-octenyl)-5-ethyl pyridinium chloride,
1-(2-octenyl)-2-n-propyl pyrinidium chloride,
1-(2-octenyl)-3-n-propyl pyridinidum chloride,
1-(2-octenyl)-4-n-propyl pyridinium chloride,
1-(2-octenyl)-5-n-propyl pyridinium chloride,
1-(2-octenyl)-2-isopropyl pyridinidum chloride,
1-(2-octenyl)-3-ispropyl pyridinium chloride,
1-(2-octenyl)-4-isopropyl pyridinium chloride,
1-(2-octenyl)-5-isopropyl pyridinium chloride,
1-(2-octenyl)-2-butyl pyridinium chloride,
1-(2-octenyl)-3-butyl pyridinium chloride,
1-(2-octenyl)-4-butyl pyridinium chloride,
1-(2-octenyl)-5-butyl pyridinium chloride,
1-(2-octenyl)-2,3-dimethyl pyridinium chloride,
1-(2-octenyl)-2,4-dimethyl pyridinium chloride,
1-(2-octenyl)-2,5-dimethyl pyridinium chloride,
1-(2-octenyl)-3,4-dimethyl pyridinium chloride,
1-(2-octenyl)-3,5-dimethyl pyridinium chloride,
1-(2-octneyl)-4,5-dimethyl pyridinium chloride,
1-(2-octenyl)-2,4-diethyl pyridinium chloride,
1-(2-octenyl)-3,5-diethyl pyridinium chloride,
1-(2-octenyl)-2,5-diethyl pyridinium chloride,
1-(2-octenyl)-2,4-dipropyl pyridinium chloride,
1-(2-octenyl)-3,5-dipropyl pyridinium chloride,
1-(2-octenyl)-2,5-dipropyl pyridinium chloride,
1-(2-octenyl)-2,4-dibutyl pyridinium chloride,
1-(2-octenyl)-3,5-dibutyl pyridinium chloride,
1-(2-octenyl)-2,5-dibutyl pyridinium chloride,
1-(2-octenyl)-2-methyl-5-ethyl pyridinium chloride,
1-(2-octenyl)-2-methyl-5-propyl pyridinium chloride,
1-(2-octenyl)-2-methyl-5-butyl pyridinium chloride,
1-(2-octenyl)-2-methyl-4-ethyl pyridinium chloride,
1-(2-octenyl)-2-methyl-4-propyl pyridinium chloride, 1-(2-octenyl)-2-methyl-4-butyl pyridinium chloride,
1-(2-octenyl)-3-methyl-4-ethyl pyridinium chloride,
1-(2-octenyl)-3-methyl-4-propyl pyridinium chloride,
1-(2-octenyl)-3-methyl-4-butyl pyridinium chloride,
1-(2-octenyl)-2-propyl-5-ethyl pyridinium chloride,
1-(2-octenyl)-2-butyl-5-ethyl pyridinium chloride,
1-(2-octenyl)-2-propyl-5-butyl pyridinium chloride,
1-(5,5-dimethyl-2-hexenyl)-pyridinium chloride
1-(5,5-dimethyl-2-hexenyl)-2-methyl pyridinium chloride,
1-(5,5-dimethyl-2-hexenyl)-3-methyl pyridinium chloride,
1-(5,5-dimethyl-2-hexenyl)-4-methyl pyridinium chloride,
1-(5,5-dimethyl-2-hexenyl)-5-methyl pyridinium chloride,
1-(5,5-dimethyl-2-hexenyl)-2-ethyl pyridinium chloride,
1-(5,5-dimethyl-2-hexenyl)-3-ethyl pyridinium chloride,
1-(5,5-dimethyl-2-hexenyl)-4-ethyl pyridinium chloride,
1-(5,5-dimethyl-2-hexenyl)-5-ethyl pyridinium chloride,
1-(5,5-dimethyl-2-hexenyl)-2-n-propyl pyridinium chloride,
1-(5,5-dimethyl-2-hexenyl)-3-n-propyl pyridinium chloride,
1-(5,5-dimethyl-2-hexenyl)-4-n-propyl pyridinium chloride,
1-(5,5-dimethyl-2-hexenyl)-5-n-propyl pyridinium chloride,
1-(5,5-dimethyl-2-hexenyl)-2-isopropyl pyridinium chloride,
1-(5,5-dimethyl-2-hexenyl)-3-isopropyl pyridinium chloride,
1-(5,5-dimethyl-2-hexenyl)-4-isopropyl pyridinium chloride,
1-(5,5-dimethyl-2-hexenyl)-5-isopropyl pyridinium chloride,
1-(5,5,7,7-tetramethyl-2-octenyl)-2-methyl pyridinium chloride,
1-(5,5,7,7-tetramethyl-2-octenyl)-3-ethyl pyridinium chloride,
1-(5,5,7,7-tetramethyl-2-octenyl)-4-propyl pyridinium chloride,
1-(5,5,7,7-tetramethyl-2-octenyl)-5-butyl pyridinium chloride,
1-(5,5,7,7-tetramethyl-2-octenyl)-2,4-dimethyl pyridinium chloride,
1-(5,5,7,7-tetramethyl-2-octenyl)-3,5-dimethyl pyridinium chloride,
1-(5,5,7,7-tetramethyl-2-octenyl)-2,5-dimethyl pyridinium chloride,
1-(5,5,7,7-tetramethyl-2-octenyl)-2,4-diethyl pyridinium chloride,
1-(5,5,7,7-tetramethyl-2-octenyl)-3,5-diethyl pyridinium chloride,
1-(5,5,7,7-tetramethyl-2-octenyl)-2,5-diethyl pyridinium chloride,
1-(5,5,7,7-tetramethyl-2-octenyl)-2,4-dipropyl pyridinium chloride,
1-(5,5,7,7-tetramethyl-2-octenyl)-3,5-dipropyl pyridinium chloride,
1-(5,5,7,7 tetramethyl-2-octenyl)-2,5-dipropyl pyridinium chloride,
1-(5,5,7,7-tetramethyl-2-octenyl)-2,4-dibutyl pyridinium chloride,
1-(5,5,7,7-tetramethyl-2-octenyl)-3,5-dibutyl pyridinium chloride,
1-(5,5,7,7-tetramethyl-2-octenyl)-2,5-dibutyl pyridinium chloride,
1-(5,5,7,7-tetramethyl-2-octenyl)-2-methyl-5-ethyl pyridinium chloride,
1-(5,5,7,7-tetramethyl-2-octenyl)-2-methyl-5-propyl pyridinium chloride,
1-(5,5,7,7-tetramethyl-2-octenyl)-2-methyl-5-butyl pyridinium chloride,
1-(5,5,7,7-tetramethyl-2-octenyl)-2-methyl-4-ethyl pyridinium chloride,
1-(5,5,7,7-tetramethyl-2-octenyl)-2-methyl-4-propyl pyridinium chloride,
1-(5,5,7,7-tetramethyl-2-octenyl)-2-methyl-4-butyl pyridinium chloride,
1-(5,5,7,7-tetramethyl-2-octenyl)-3-methyl-4-ethyl pyridinium chloride,
1-(5,5,7,7-tetramethyl-2-octenyl)-3-methyl-4-propyl pyridinium chloride,
1-(5,5,7,7-tetramethyl-2-octenyl)-3-methyl-4-butyl pyridinium chloride,
1-(5,5,7,7-tetramethyl-2-octenyl)-2-propyl-5-ethyl pyridinium chloride,
1-(5,5,7,7-tetramethyl-2-octenyl)-2-butyl-5-ethyl pyridinium chloride,
1-(5,5,7,7-tetramethyl-2-octenyl)-2-propyl-5-butyl pyridinium chloride,
1-(2-butenyl)-2-methyl-5-ethyl pyridinium chloride,
1-(2-pentenyl)-2-methyl-5-ethyl pyridinium chloride,
1-(2-hexenyl)-2-methyl-5-ethyl pyridinium chloride,
1-(2-heptenyl)-2-methyl-5-ethyl pyridinium chloride,
1-(2-octenyl)-2-methyl-5-ethyl pyridinium chloride,
1-(2-nonenyl)-2-methyl-5-ethyl pyridinium chloride,
1-(2-decenyl)-2-methyl-5-ethyl pyridinium chloride,
1-(2-undecenyl)-2-methyl-5-ethyl pyridinium chloride,
1-(2-dodecenyl)-2-methyl-5-ethyl pyridinium chloride,
1-(2-tridecenyl)-2-methyl-5-ethyl pyridinium chloride,
1-(2-tetradecenyl)-2-methyl-5-ethyl pyridinium chloride,
1-(2-pentadecenyl)-2-methyl-5-ethyl pyridinium chloride,
1-(2-hexadecenyl)-2-methyl-5-ethyl pyridinium chloride,
1-(2-hepdecenyl)-2-methyl-5-ethyl pyridinium chloride,
1-(2-octadecenyl)-2-methyl-5-ethyl pyridinium chloride,
1-(2-nondecenyl)-2-methyl-5-ethyl pyridinium chloride,
1-(2-eicosenyl)-2-methyl-5-ethyl pyridinium chloride,
1-(2-heneicosenyl)-2-methyl-5-ethyl pyridinium chloride,
1-[4-(2-cyclopentenyl)-2-butenyl] pyridinium chloride,
1-[4-(3-cyclopentenyl)-2-butenyl]-2-methyl-5-ethyl pyridinium chloride,
1-[4-(2-cyclopentenyl)-2-pentenyl]-2-methyl-5-ethyl pyridinium chloride,
1-[4-(2-cyclopentenyl)-2-hexenyl]-2-methyl-5-ethyl pyridinium chloride,
1-[4-(2-cyclopentenyl)-2-heptenyl]-2-methyl-5-ethyl pyridinium chloride,
1-[4-(2-cyclopentenyl)-2-octenyl]-2-methyl-5-ethyl pyridinium chloride,
1-[4-(2-cyclopentenyl)-2-nonenyl]-2-methyl-5-ethyl pyridinium chloride,
1-[4-(2-cyclopentenyl)-2-decenyl]-2-methyl-5-ethyl pyridinium chloride,
1-[5-(2-cyclopentenyl)-2-octenyl]-2-methyl-5-ethyl pyridinium chloride,
1-[6-(2-cyclopentenyl)-2-octenyl]-2-methyl-5-ethyl pyridinium chloride,
1-[7-(2-cyclopentenyl)-2-octenyl]-2-methyl-5-ethyl pyridinium chloride,
1-[8-(2-cyclopentenyl)-2-octenyl]-2-methyl-5-ethyl pyridinium chloride,
1-[4-(2-cyclohexenyl)-2-butenyl]-2-methyl-5-ethyl pyridinium chloride,
1-[4-(3-cyclohexenyl)-2-butenyl]-2-methyl-5-ethyl pyridinium chloride, and the corresponding bromides.

The second group group may be represented by the general formula:

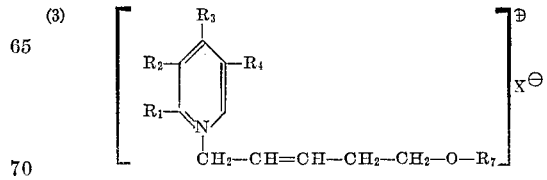

(3)

wherein $R_1$, $R_2$, $R_3$, $R_4$ and $X$ are as defined above and $R_7$ is an alkyl radical having from one to ten carbon atoms, inclusive.

Typical of the compounds of this second group is

1-[5-(2-ethylhexoxy)-2-pentenyl]-2-methyl-5'-ethyl pyridinium chloride, which has the structural formula:

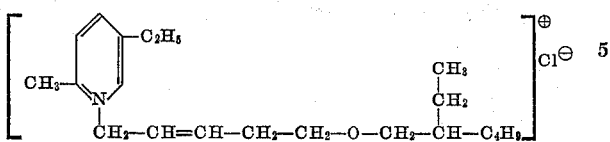

Also illustrative of the compounds of this group are:
1-(5-methoxy-2-pentenyl)-2-methyl-5-ethyl pyridinium chloride, 1-(5-ethoxy-2-pentenyl)-2-methyl-5-ethyl pyridinium chloride, 1-(5-propoxy-2-pentenyl)-2-methyl-5-ethyl pyridinium chloride, 1-(5-butoxy-2-pentenyl)-2-methyl-5-ethyl pyridinium chloride, 1-(5-pentoxy-2-pentenyl)-2-methyl-5-ethyl pyridinium chloride, 1-(5-hexoxy-2-pentenyl)-2-methyl-5-ethyl pyridinium chloride, 1-(5-heptoxy-2-pentenyl)-2-methyl-5-ethyl pyridinium chloride, 1-(5-octoxy-2-pentenyl)-2-methyl-5-ethyl pyridinium chloride, 1-(5-nonoxy-2-pentenyl)-2-methyl-5-ethyl pyridinium chloride, 1-(5-decoxy-2-pentenyl)-2-methyl-5-ethyl pyridinium chloride, 1-(5-hexoxy-2-pentenyl)-pyridinium chloride, 1-(5-hexoxy-2-pentenyl)-2-methyl pyridinium chloride, 1-(5-hexoxy-2-pentenyl)-3-methyl pyridinium chloride, 1-(5-hexoxy-2-pentenyl)-4-methyl pyridinium chloride, 1-(5-hexoxy-2-pentenyl)-5-methyl pyridinium chloride, 1-(5-hexoxy-2-pentenyl)-2-ethyl pyridinium chloride, 1-(5-hexoxy-2-pentenyl)-3-ethyl pyridinium chloride, 1-(5-hexoxy-2-pentenyl)-4-ethyl pyridinium chloride, 1-(5-hexoxy-2-pentenyl)-5-ethyl pyridinium chloride, 1-(5-hexoxy-2-pentenyl)-2-n-propyl pyridinium chloride, 1-(5-hexoxy-2-pentenyl)-3-n-propyl pyridinium chloride, 1-(5-hexoxy-2-pentenyl)-4-n-propyl pyridinium chloride, 1-(5-hexoxy-2-pentenyl)-5-n-propyl pyridinium chloride, 1-(5-hexoxy-2-pentenyl)-2-isopropyl pyridinium chloride, 1-(5-hexoxy-2-pentenyl)-3-isopropyl pyridinium chloride, 1-(5-hexoxy-2-pentenyl)-4-isopropyl pyridinium chloride, 1-(5-hexoxy-2-pentenyl)-5-isopropyl pyridinium chloride, 1-(5-hexoxy-2-pentenyl)-2-butyl pyridinium chloride, 1-(5-hexoxy-2-pentenyl)-3-pentyl pyridinium chloride, 1-(5-hexoxy-2-pentenyl)-4-hexyl pyridinium chloride, 1-(5-hexoxy-2-pentenyl)-5-heptyl pyridinium chloride, 1-(5-hexoxy-2-pentenyl)-2-octyl pyridinium chloride, 1-(5-hexoxy-2-pentenyl)-3-octyl pyridinium chloride, 1-(5-hexoxy-2-pentenyl)-4-octyl pyridinium chloride, 1-(5-hexoxy-2-pentenyl)-2,3-dimethyl pyridinium chloride, 1-(5-hexoxy-2-pentenyl)-2,4-dimethyl pyridinium chloride, 1-(5-hexoxy-2-pentenyl)-2,5-dimethyl pyridinium chloride, 1-(5-hexoxy-2-pentenyl)-3,4-dimethyl pyridinium chloride, 1-(5-hexoxy-2-pentenyl)-3,5-dimethyl pyridinium chloride, 1-(5-hexoxy-2-pentenyl)-4,5-dimethyl pyridinium chloride, 1-(5-hexoxy-2-pentenyl)-2,3-diethyl pyridinium chloride, 1-(5-hexoxy-2-pentenyl)-2,4-diethyl pyridinium chloride, 1-(5-hexoxy-2-pentenyl)-2,5-diethyl pyridinium chloride, 1-(5-hexoxy-2-pentenyl)-3,4-diethyl pyridinium chloride, 1-(5-hexoxy-2-pentenyl)-3,5-diethyl pyridinium chloride, 1-(5-hexoxy-2-pentenyl)-4,5-diethyl pyridinium chloride, 1-(5-hexoxy-2-pentenyl)-2-methyl-3-ethyl pyridinium chloride, 1-(5-hexoxy-2-pentenyl)-2-methyl-4-ethyl pyridinium chloride, 1-(5-hexoxy-2-pentenyl) - 2 - methyl - 5 - butyl pyridinium chloride, and the like, and the corresponding bromides.

The compounds employed in the present invention may be prepared, generally, by the reaction of a suitable pyridine compound with a suitably substituted mono-olefin. This general reaction may be depicted graphically as follows:

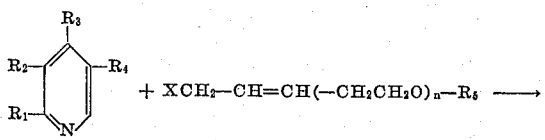

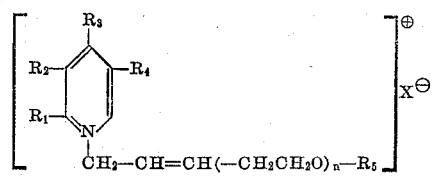

wherein $R_1$, $R_2$, $R_3$, $R_4$, $R_5$, $n$ and X are as defined above.

When effecting this reaction, it is preferable to employ equimolar proportions of reactants. However, greater or lesser amounts of either reactant, for example amounts of pyridine compound ranging from as little as 0.1 mole to as much as 10 moles, per mole of monohalosubstituted monoolefin present, can also be employed.

The reaction readily occurs at temperatures ranging from as low as 60° C. to as high as 200° C., but is preferably effected at temperatures ranging from 80° C. to 130° C.

Atmospheric pressure is usually employed in effecting the reaction, but pressures both above and below atmospheric pressure, for example, pressures ranging from 1 mm. Hg to as high as 10 atmospheres can be used whenever it is desirable to do so.

When carrying out the reaction, the reaction product separates out as a solid or viscous oil which may be separated by techniques known to the art, and may be purified by washing with petroleum ether and like solvents.

The following example is illustrative of the preparation of the compounds employed in the present invention.

EXAMPLE I

*Preparation of 1-(5,5,7,7-Tetramethyl-2-Octenyl)-2-Methyl-5-Ethyl Pyridinium Chloride*

Following the general procedure set forth above, an admixture of 50.6 grams of ninety percent by weight pure 1-chloro-5,5,7,7-tetramethyl-2-octene (0.23 mole) and 27.5 grams of 2-methyl-5-ethylpyridine (0.23 mole) was prepared and heated, with stirring, at a temperature of from 110° C. to 125° C. for twelve hours. At the end of this time, a liquid layer, weighing 11.5 grams, which had accumulated on top of the reaction mixture, was decanted. The remainder of the reaction mixture was washed successively with five 30-milliliter portions of petroleum ether, and dried under vacuum. The dried material was a tan solid which weighed 68.2 grams, and consisted of 1-(5,5,7,7-tetramethyl-2-octenyl)-2-methyl-5-ethylpyridinium chloride with 4.7 percent by weight of a 2-methyl-5-ethylpyridine hydrochloride present as an impurity (as determined by titration with sodium hydroxide using phenolphthalein as an indicator). This represented a yield of 89 percent of theoretical. When this material was recrystallized from acetone, a white, solid product, 1-(5,5,7,7-tetramethyl-2-octenyl)-2-methyl-5-ethylpyridinium chloride was recovered. This compound had a melting point of 88–92° C. and was identified by chemical analysis.

*Analysis.*—Calculated for $C_{20}H_{34}NCl$: Cl, 10.94%; N, 4.37%. Found: Cl, 10.53%; N, 4.25%.

The compounds used in accordance with the method of this invention have excellent defoliating properties. Their physical properties are desirable in that formulations are easily made, they are safe to use, and they do not possess a disagreeable odor.

The plants that may be defoliated in accordance with the present invention are cotton and leguminous plants, such as peas, beans, and peanuts.

When preparing the defoliants used in this invention, the compounds described above are admixed with an inert carrier. This carrier may be a liquid or a solid and may contain surface active agents, sticker-spreaders, and the like. An outstanding advantage of the compounds employed in this invention is their high water solubility, coupled with possession of surface active properties when dissolved in water. Thus, water is the preferred carrier, formulations being prepared by simply dissolving the compounds in water to form aqueous solutions of the preferred concentrations. If desired, surface active agents may be added to enhance the surfactive characteristics of the compounds themselves. Suitable agents are "Tergitol NPX," an alkyl phenyl polyethylene glycol ether, "Daxad 21," an alkyl aryl sodium sulfonate, and the like. A sticker-spreader such as glycerine or "Carbowax," a non-volatile solid polyethylene glycol, may also be added to insure adhesion of the formulation to the plant after spraying. Liquid carriers other than water may be employed. The compounds used in this invention are also soluble in organic solvents such as ethanol, and acetone, and the like, and could be applied in solutions of these solvents. Alternatively, application may be made in the form of dusts or powders where the active compounds are admixed with a solid carrier such as clay, attapulgite, pyrophyllite, or talc, or formed into granular formulations by absorption on a clay-like carrier. However, formulation in water solution presents the simplest and easiest method of application. The concentration of alkenyl pyridinium quaternary in the final formulation may be from about 0.1 to about 25 weight percent.

Generally, effective amounts of the alkenyl pyridinium quaternary range from about 1 to about 10 pounds per acre, and preferably from about 2 to about 8 pounds per acre. The precise concentration, within the broad range, to be used in any given field will depend on the specific soil conditions, the variety and age of the plants to be treated, the amount of foliage present, and environmental factors such as temperature, light, humidity, and rainfall. For example, as the plant approaches maturity, it is more readily defoliated, thus requiring less chemical. Actively growing, highly vegetative plants are generally more difficult to defoliate and, hence, require more chemical. It should be noted at this point that another characteristic of the compounds contemplated for the use in this invention imposes an upper limit on the effective amount that may be applied. The compounds possess strong desiccating properties when applied in amounts slightly higher than those used for effective defoliation. This desiccating action results in drying out of the plant tissue and "freezing" of the leaves, i.e. the leaves are dried out but adhere to the stem and thus are not removed. Whereas this result is normally to be avoided, in certain instances it may be desirable. For example, when harvesting "stripper" cotton, where the bolls and the leaves both are removed from the stem, desiccation prior to harvesting facilitates treatment of the removed crop.

When carrying out this invention by employing the compounds in water solution, the gallonage per acre may range from about 4 to about 150 gallons per acre, but is preferably between about 10 and 20 gallons per acre. The concentration of compound in water solution may thus be from about 0.1 to about 25 percent by weight, and is preferably from about 1 to about 10 weight percent.

In the following experiments, cotton plants were defoliated in accordance with the present invention. The compounds were dissolved in water to give solutions of the indicated concentrations. Application to the plants was made by spraying the solution, using standard hand equipment, to give the indicated rates in pounds of test compound per acre. The plants sprayed were cotton, variety Coker 100A, growing under greenhouse conditions. Application was made while these plants were in the boll stage of growth. The results were observed seven to ten days after application by visual inspection of the plants and are expressed in terms of percent defoliation, i.e. 100× the number of leaves removed divided by the sum of the number of leaves removed plus the number of leaves remaining on the plant at the time of inspection. Table I summarizes the results of these tests.

TABLE I

| Compound | Weight percent compound in water solution | Concentration in pounds/acre | Percent defoliation |
| --- | --- | --- | --- |
| 1-(5,5,7,7-Tetramethyl-2-octenyl)-2-methyl-5-ethyl pyridinium chloride | 0.72 | 3 | 87 |
| | 1.20 | 5 | 100 |
| 1-(5,5-Dimethyl-2-hexenyl)-2-methyl-5-ethyl pyridinium chloride | 0.24 | 1 | 75 |
| | 0.72 | 3 | 90 |
| | 1.20 | 5 | 95 |
| 1-(5,5,7,7-Tetramethyl-2-octenyl)-2-methyl-5-butyl pyridinium chloride | 0.24 | 1 | 40 |
| | 0.72 | 3 | 70 |
| | 1.20 | 5 | 95 |
| 1-(5,5,7,7-Tetramethyl-2-octenyl) pyridinium chloride | 0.48 | 2 | 30 |
| | 1.20 | 5 | 98 |
| 1-(5,5,7,7-Tetramethyl-2-octenyl)-3-methyl pyridinium chloride | 0.48 | 2 | 90 |
| | 1.20 | 5 | 95 |
| 1-(5,5,7,7-Tetramethyl-2-octenyl)-3,5-dimethyl pyridinium chloride | 0.48 | 2 | 85 |
| | 1.20 | 5 | 93 |
| 1-[4-(2-Cylcopentenyl)-2-butenyl]-2-methyl-5-ethyl pyridinium chloride | 0.48 | 2 | 80 |
| | 1.20 | 5 | 60 |
| 1-[5-(2-Ethylhexoxy)-2-pentenyl]-2-methyl-5-methyl pyridinium chloride | 0.24 | 1 | 25 |
| | 0.72 | 3 | 75 |
| | 1.20 | 5 | 70 |

It can be seen from Table I that excellent defoliation is effected when amounts above about two pounds per acre are applied.

In addition to the above-described experiments, the following field test was carried out for 1-(5,5,7,7-tetramethyl-2-octenyl)-5-ethyl-2-methyl pyridinium chloride (hereinafter referred to as compound 1), typical of the compounds contemplated for use in this invention. The crop treated was cotton, variety Coker 100, growing in Norfolk sandy loam under normal field conditions in southeastern U.S. The plants were in the early green boll stage, exhibiting rank growth. Application of compound 1 was made in water solution at various gallonages at rates of 2.5 and 3.75 pounds per acre, using standard spray equipment. The test results, observed eleven days after application by comparative visual inspection of leaf drop in treated and non-treated rows showed that application of the spray at the rate of ten to twenty gallons per acre proved most effective under the conditions described.

Further field tests were performed to test the effectiveness of the compounds contemplated for use in this invention under widely varying environmental conditions. The compounds tested were compound 1 and 1-(5,5-dimethyl-2-hexenyl)-2-methyl-5-ethyl pyridinium chloride, hereinafter referred to as compound 2. The following examples describe these tests and their results.

EXAMPLE II

The crop treated was cotton, with 60 percent of the bolls open, growing under normal field conditions in the southwestern United States. Application of compounds 1 and 2 was made in water solution, using standard spraying equipment, at a gallonage of 24 gallons/acre to give the indicated rates in pounds of compound/acre. The results, observed ten days after application, were obtained by visual inspection and are given in Table II below.

TABLE II

|  | Rate, pounds/acre | Percent defoliation |
|---|---|---|
| Compound 1 | 2.5 | 87 |
|  | 5.0 | 96 |
|  | 7.5 | 98 |
| Compound 2 | 2.5 | 90 |
|  | 5.0 | 99 |

EXAMPLE III

The crop treated was cotton, with about sixty percent of the bolls open, growing under normal field conditions in the southwestern United States. Application of compounds 1 and 2 was made in water solution, using standard spraying equipment, at a gallonage of 12 gallons/acre, to give the indicated rates in pounds of compound/acre. The results, observed 10 days after application, were obtained by visual inspection and are given in Table III below.

TABLE III

|  | Rate, pounds/acre | Percent defoliation |
|---|---|---|
| Compound 1 | 2.5 | 100 |
|  | 5.0 | 98 |
| Compound 2 | 2.5 | 98 |
|  | 5.0 | 98 |

EXAMPLE IV

Cotton, variety Acala 442, growing under normal field conditions in the west coast area of the United States was sprayed while the plants were from four to five feet high. Application was made by aircraft flying approximately seven feet above the plants at a speed of seventy miles per hour. An aqueous solution containing 5.5 percent by weight of compound 1 was sprayed through 1080 T jets, 38 nozzles, at the rate of 4.75 pounds of compound 1 per acre (10 gallons of spray per acre). The test results, observed eight days after application by actual leaf count, showed 92.5 percent defoliation.

EXAMPLE V

The crop treated was cotton, variety Stoneville 7, with 50 to 75 percent of the bolls open, growing under normal field conditions in Argentina. A dilute water solution of compound 1 was sprayed, using standard spraying equipment, at a rate of 5 pounds of compound 1 per acre. The test results, observed six days after application by actual leaf count, showed 90 percent defoliation.

EXAMPLE VI

The crop treated was cotton, variety Dixie King, with 50 to 75 percent of the bolls open, growing under normal field conditions in Argentina. Dilute water solutions of compounds 1 and 2 were applied to give the indicated rates in pounds per acre. The test results, observed seventeen days after application by actual leaf count, are given in Table IV below.

TABLE IV

|  | Rate, pounds/acre | Percent defoliation |
|---|---|---|
| Compound 1 | 2.5 | 84 |
|  | 5.0 | 90 |
| Compound 2 | 2.5 | 80 |
|  | 5.0 | 90 |

EXAMPLE VII

Cotton, variety Delta Pine 15, growing under normal field conditions in the southwestern United States, in the boll stage, was treated as follows: aqueous solutions of compound 1 were prepared in concentrations of 1.2 percent and 2.4 percent (by weight). Application was made by use of standard spray equipment mounted on a high clearance rig at the rate of twenty-five gallons per acre, corresponding to 2.5 and 5 pounds per acre of compound 1, respectively. The test results, observed five days after application by visual inspection, showed 89% and 91% defoliation, respectively. Plant leaves treated at the higher rate were found to have been desiccated to the extent that about 6% of the leaves were dried out.

EXAMPLE VIII

The crop treated was cotton, variety Acala 1517-C, with about 80% of the bolls open, growing under normal field conditions in the southwestern United States. Two rows of the crop, each 300 feet long, were treated. Application of compound 1 was made in water solution, using standard spraying equipment, at a gallonage of 15 gallons/acre to give rates of 2.5 and 5 pounds of compound per acre. The results, observed ten days after application by visual inspection, showed 90% defoliation at both 2.5 pounds/acre and 5.0 pounds/acre.

EXAMPLE IX

The crop treated was cotton, variety Coker 100W, 3 feet tall, growing under normal field conditions in the southeastern United States. Application of compound 1 was made in water solution, using standard spraying equipment, at a gallonage of 15 gallons per acre to give rates of 2.5 and 5.0 pounds of compound per acre. The results, obtained by visual observation fifteen days after application, showed 85% defoliation at the 2.5 pound/acre rate and 93% defoliation at the 5 pound/acre rate.

EXAMPLE X

The crop treated was cotton, variety Coker 100W, 3½ feet tall, growing under normal field conditions in the southeastern United States. Application of compound 1 was made in water solution, using standard spraying equipment, at a gallonage of 13.3 gallons/acre to give rates of 2.5 and 5.0 pounds of compound per acre. The test results, observed fourteen days after application by visual inspection, showed 80% defoliation at the 2.5 pound rate and 90% defoliation at the 5 pound rate.

What is claimed is:

1. The method for defoliating plants which comprises applying to the plants a defoliatingly effective amount of a compound having the general formula:

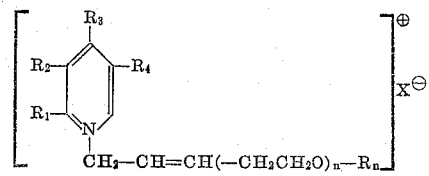

wherein $R_1$, $R_2$, $R_3$, and $R_4$ are selected from the group consisting of hydrogen and alkyl radicals having from one to eight carbon atoms, inclusive; $n$ is an integer having a value from 0 to 1; when $n$ is 0, $R_5$ is a member selected alkenyl-cycloalkyl radicals and alkeny-cycloalkenyl radicals, alkyl-cycloalkyl radicals, alkyl-cycloalkenyl radicals, alkenyl-cycloalkyl radicals and alkeny-cycoalkenyl radicals and contains from one to eighteen carbon atoms, inclusive; when $n$ is 1, $R_5$ is an alkyl radical having from one to ten carbon atoms, inclusive; and X is a halogen radical selected from the group consisting of chlorine and bromine.

2. The method for defoliating plants which comprises applying to the plants a defoliatingly effective amount of a compound having the general formula:

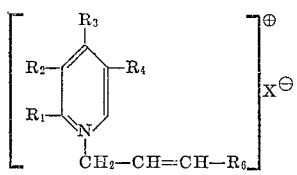

wherein $R_1$, $R_2$, $R_3$, and $R_4$ are selected from the group consisting of hydrogen and alkyl radicals having from one to eight carbon atoms, inclusive; $R_6$ is a member selected from the group consisting of alkyl radicals, alkenyl radicals, alkyl-cycloalkyl radicals, alkyl-cycloalkenyl radicals, alkenyl-cycloalkyl radicals, and alkenyl-cycloalkenyl radicals, and contains from one to eighteen carbon atoms, inclusive; and X is a halogen radical selected from the group consisting of chlorine and bromine.

3. The method for defoliating plants which comprises applying to the plants a defoliatingly effective amount of a compound having the general formula:

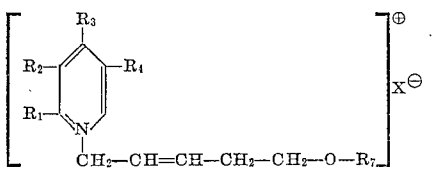

wherein $R_1$, $R_2$, $R_3$, and $R_4$ are selected from the group consisting of hydrogen and alkyl radicals having from one to eight carbon atoms, inclusive; $R_7$ is an alkyl radical having from one to ten carbon atoms, inclusive; and X is a halogen radical selected from the group consisting of chlorine and bromine.

4. The method for defoliating cotton plants which comprises applying to the plants a defoliatingly effective amount of a compound responding to the general formula of claim 1.

5. The method for defoliating cotton plants which comprises applying to the plants a defoliatingly effective amount of 1 - (5,5 - dimethyl - 2 - hexenyl) - 2 - methyl-5-ethyl pyridinium chloride.

6. The method for defoliating cotton plants which comprises applying to the plants a defoliatingly effective amount of 1 - (5,5,7,7 - tetramethyl - 2 - octenyl) - 2-methyl-5-ethyl pyridinium chloride.

7. The method for defoliating cotton plants which comprises applying to the plants a defoliatingly effective amount of 1 - (5,5,7,7 - tetramethyl - 2 - octenyl) - 2-methyl-5-butyl pyridinium chloride.

8. The method for defoliating cotton plants which comprises applying to the plants a defoliatingly effective amount of 1 - (5,5,7,7 - tetramethyl - 3 - octenyl) pyridinium chloride.

9. The method for defoliating cotton plants which comprises applying to the plants a defoliatingly effective amount of 1-(5,5,7,7-tetramethyl-2-octenyl)-3-methyl pyridinium chloride.

10. The method for defoliating cotton plants which comprises applying to the plants a defoliatingly effective amount of 1-(5,5,7,7-tetramethyl-2-octenyl)-3,5-dimethyl pyridinium chloride.

11. The method for defoliating cotton plants which comprises applying to the plants a defoliatingly effective amount of 1-[4-(2-cyclopentenyl)-2-butenyl]-2-methyl-5-ethyl pyridinium chloride.

12. The method for defoliating cotton plants which comprises applying to the plants a defoliatingly effective amount of 1 - [5 - ( 2 - ethylhexoxy) - 2 - pentenyl] - 2-methyl-5-ethyl pyridinium chloride.

13. The method for defoliating plants which comprises applying to the plants a defoliatingly effective amount of a compound having the general formula:

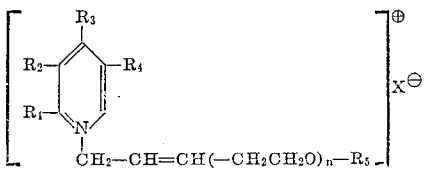

wherein $R_1$, $R_2$, $R_3$, and $R_4$ are selected from the group consisting of hydrogen and alkyl radicals having from one to four carbon atoms, inclusive; $n$ is an integer having a value from 0 to 1; when $n$ is 0, $R_5$ is a member selected from the group consisting of alkyl radicals, alkenyl radicals, alkyl-cycloalkyl radicals, alkyl-cycloalkenyl radicals, alkenyl-cycloalkyl radicals and alkenyl-cycloalkenyl radicals and contains from five to ten carbon atoms, inclusive; where $n$ is 1, $R_5$ is an alkyl radical having from one to ten carbon atoms, inclusive; and X is a halogen radical selected from the group consisting of chlorine and bromine.

14. The method for defoliating plants which comprises applying to the plants a defoliatingly effective amount of a compound having the general formula:

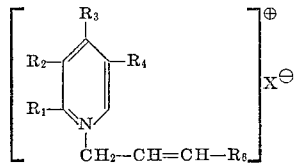

wherein $R_1$, $R_2$, $R_3$, and $R_4$ are selected from the group consisting of hydrogen and alkyl radicals having from one to four carbon atoms, inclusive; $R_6$ is a member selected from the group consisting of alkyl radicals, alkenyl radicals, alkyl-cycloalkyl radicals, alkyl-cycloalkenyl radicals, alkenyl-cycloalkyl radicals, and alkeny-cycloalkenyl radicals, and contains from five to ten carbon atoms, inclusive; and X is a halogen radical selected from the group consisting of chlorine and bromine.

15. The method for defoliating plants which comprises applying to the plants a defoliatingly effective amount of a compound having the general formula:

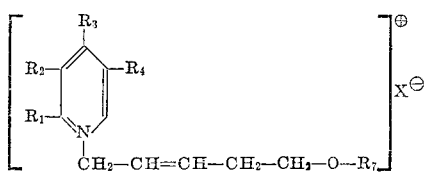

wherein $R_1$, $R_2$, $R_3$, and $R_4$ are selected from the group consisting of hydrogen and alkyl radicals having from one to four carbon atoms, inclusive; $R_7$ is an alkyl radical having from one to ten carbon atoms, inclusive; and X is a halogen radical selected from the group consisting of chlorine and bromine.

References Cited in the file of this patent

UNITED STATES PATENTS 2,734,815   Mowry et al. _____ Feb. 14, 1956

OTHER REFERENCES

Schlesinger et al. in "Journal of Agricultural and Food Chemistry," vol. 7, No. 1, January 1959, pages 33 and 34.

King: "Insecticides and Repellents," Dept. of Agricultural Handbook, No. 69, May 1954, pages 6 and 298.

UNITED STATES PATENT OFFICE
CERTIFICATE OF CORRECTION

Patent No. 3,069,253                        December 18, 1962

Anthony A. Sousa

It is hereby certified that error appears in the above numbered patent requiring correction and that the said Letters Patent should read as corrected below.

Column 10, lines 55 to 60, for the lower right-hand portion of the formula reading "-R$_n$" read -- -R$_5$ --; same column, lines 67 to 70, beginning with "alkenyl-cycloalkyl radicals" strike out all to and including "alkeny-cycoalkenyl radicals", and insert instead -- from the group consisting of alkyl radicals, alkenyl radicals, alkyl-cycloalkyl radicals, alkyl-cycloalkenyl radicals, alkenyl-cycloalkyl radicals and alkenyl-cycloalkenyl radicals --.

Signed and sealed this 23rd day of July 1963.

(SEAL)
Attest:

ERNEST W. SWIDER
Attesting Officer

DAVID L. LADD
Commissioner of Patents